United States Patent
Veneshetty (10) Patent No.: US 10,848,966 B1
(45) Date of Patent: Nov. 24, 2020

(54) WIRELESS ACCESS SYSTEM FOR CONTROLLING ACCESS TO A DEVICE

(71) Applicant: Caterpillar Inc., Deerfield, IL (US)

(72) Inventor: Arjun Veneshetty, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/439,003

(22) Filed: Jun. 12, 2019

(51) Int. Cl.
| | |
|---|---|
| *H04M 1/66* | (2006.01) |
| *H04M 3/16* | (2006.01) |
| *H04W 12/04* | (2009.01) |
| *H04W 12/00* | (2009.01) |
| *H04W 12/08* | (2009.01) |

(52) U.S. Cl.
CPC ....... *H04W 12/04* (2013.01); *H04W 12/0027* (2019.01); *H04W 12/08* (2013.01)

(58) Field of Classification Search
None
See application file for complete search history.

(56) References Cited

U.S. PATENT DOCUMENTS

| | | | |
|---|---|---|---|
| 7,656,271 B2 | 2/2010 | Ehrman et al. | |
| 7,750,811 B2 | 7/2010 | Puzio et al. | |
| 8,976,014 B2 | 3/2015 | Magner et al. | |
| 9,530,137 B2 | 12/2016 | Weiss | |
| 9,532,225 B2 | 12/2016 | MacKenzie et al. | |
| 9,535,675 B2 | 1/2017 | Mohamad Abdul et al. | |
| 9,666,005 B2 | 5/2017 | Ellis et al. | |
| 9,716,698 B2 | 7/2017 | Abdallah et al. | |
| 2015/0045013 A1* | 2/2015 | Simmons | G07C 5/008 455/420 |
| 2016/0094550 A1* | 3/2016 | Bradley | H04W 4/80 726/7 |
| 2016/0261602 A1* | 9/2016 | Glassco | H04L 63/0876 |
| 2017/0195331 A1 | 7/2017 | Wu et al. | |
| 2019/0213810 A1* | 7/2019 | Lundberg | G07C 9/20 |

* cited by examiner

*Primary Examiner* — Erika A Washington
(74) *Attorney, Agent, or Firm* — Leydig, Voit & Mayer, Ltd.

(57) ABSTRACT

A method of enrolling a mobile device to provide subsequent access to a device includes actuating a mechanical switch electrically connected to the device, generating a mobile device identification number, and generating, with an on-board controller of the device, a mobile device key. The method further includes transmitting, from the device to the mobile device, the mobile device identification number and the mobile device key, storing, with the on-board controller, the mobile device identification number, and storing, with a mobile device controller, the mobile device identification number and the mobile device key. A system is also provided.

17 Claims, 6 Drawing Sheets

WIRELESS ACCESS SYSTEM FOR CONTROLLING ACCESS TO A DEVICE

TECHNICAL FIELD

This disclosure relates generally to wirelessly controlling devices and, more particularly, to a system and method for controlling the manner in which wireless access to a device is granted.

BACKGROUND

Devices such as machines are used in various industries to perform desired operations at work sites. In many instances, such devices may be controlled by, or access to data relating to the devices provided through, wireless systems such as handheld mobile devices. The mobile devices can be readily used to wirelessly monitor the health of devices such as engines at a work site.

In some instances, access through the mobile devices is controlled or established through a remote system such as a back office system. Such back office system may include a remote server. However, some work sites may not include access to such a remote system or a work site operator may not desire access to such a remote system. In such case, a server system for confirming that a mobile device has been granted proper access may be challenging.

U.S. Pat. No. 10,075,576 discloses a system for controlling access to a machine and includes an on-board controller, a remote server, and a mobile device. The remote server generates a mobile device ID, a mobile device key, and a machine key. The mobile device ID and the mobile device key are received by the mobile device from the remote server. The on-board controller receives the mobile device ID from the mobile device and the machine key from the remote server. The on-board controller determines the mobile device key based on the mobile device ID and the machine key. Using the mobile device key, the on-board controller and the mobile device interact to start the machine upon confirming that the mobile device is authorized to remotely start the machine.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In a first aspect, a method of enrolling a mobile device to provide subsequent access to a device includes actuating a mechanical switch electrically connected to the device, generating a mobile device identification number, and generating, with an on-board controller of the device, a mobile device key. The method further includes transmitting, from the device to the mobile device, the mobile device identification number and the mobile device key, storing, with the on-board controller, the mobile device identification number, and storing, with a mobile device controller, the mobile device identification number and the mobile device key.

In another aspect, a system for enrolling a mobile device to provide subsequent access to a device includes a mechanical switch, an on-board controller, and a mobile device. The mechanical switch is electrically connected to the device. The on-board controller is operatively connected to the device and is configured to after actuation of the mechanical switch, generate a mobile device key, transmit to the mobile device the a mobile device identification number and the mobile device key, and store the mobile device identification number. The mobile device includes a user interface and a mobile device controller. The mobile device controller is configured to store the mobile device identification number and the mobile device key.

BRIEF DESCRIPTION OF THE DRAWINGS

The present disclosure is illustrated by way of example and is not limited in the accompanying figures in which like reference numerals indicate similar elements and in which.

DETAILED DESCRIPTION

Figure 1:
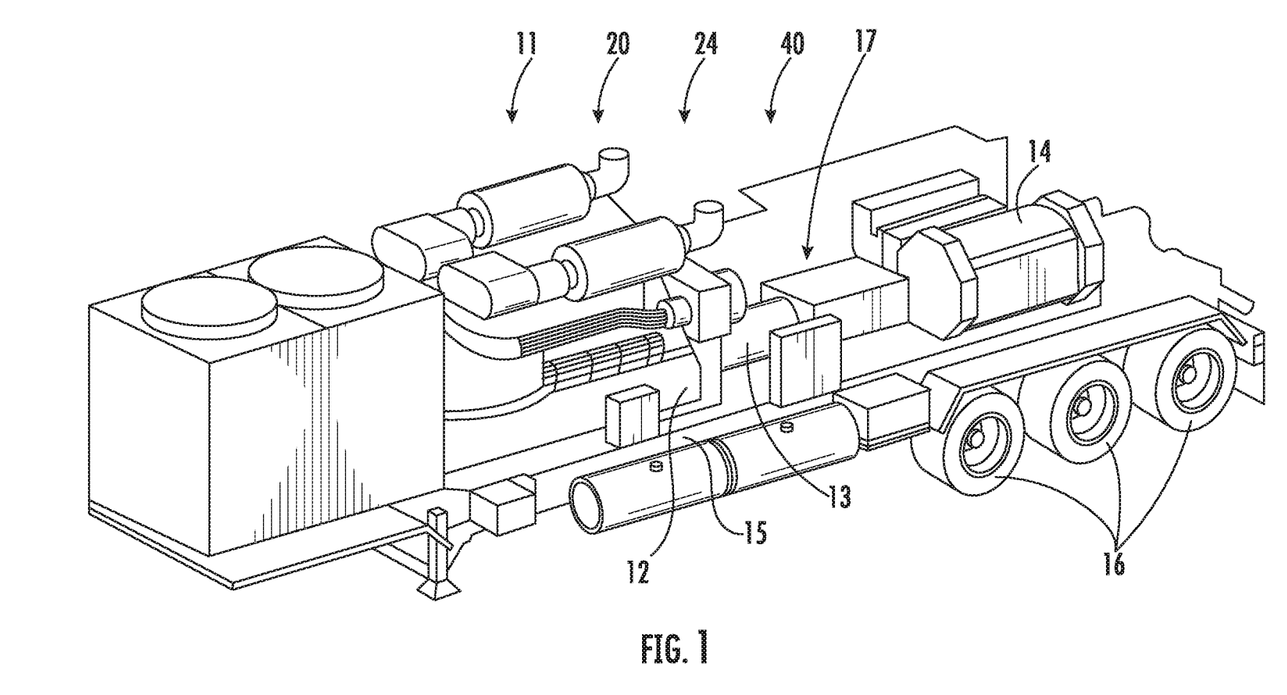
FIG. 1 depicts a block diagram of an exemplary pumping system with which the principles disclosed herein may be used.

Referring to FIG. 1, a device 10 such as a pumping system 11 is illustrated that is suited for use with geological fracturing processes to recover oil and/or natural gas from the earth. The pumping system 11 may include a prime mover such as an engine 12, a transmission 13 that is operatively connected to and driven by engine 12, and a hydraulic pump 14 that is operatively connected to and driven by the transmission 13. In one example, the engine 12 may be an internal combustion engine that combusts diesel fuel.

The hydraulic pump 14 may be configured to pump hydraulic or fracking fluid into the ground to fracture rock layers during the fracturing process. Because the fracturing process may require introduction of hydraulic fluids at different locations about the fracturing site, the components of the pumping system may be supported on a mobile trailer 15 disposed on wheels 16 to enable transportation of the system about the fracturing site.

The device 10 such as the pumping system 11 may include and be controlled by an on-board control system 20 as shown generally by an arrow in FIG. 1 indicating association with the pumping system 11. The on-board control system 20 may include an electronic control module or controller such as an on-board controller 21 that controls the operation of various aspects of the pumping system 11. The control system 20 may utilize an architecture such as a CAN bus generally indicated at 22 (FIG. 2) to facilitate communication between the components of the device 10.

The on-board controller 21 may be an electronic controller that operates in a logical fashion to perform operations, execute control algorithms, store and retrieve data and other desired operations. The on-board controller 21 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the on-board controller 21 such as power supply circuitry, signal conditioning circuitry, driver circuitry, and other types of circuitry.

The on-board controller 21 may be a single controller or may include more than one controller disposed to control various functions and/or features of the pumping system 11. The term "controller" is meant to be used in its broadest sense to include one or more controllers and/or microprocessors that may be associated with the pumping system 11 and that may cooperate in controlling various functions and operations of the pumping system. The functionality of the on-board controller 21 may be implemented in hardware and/or software without regard to the functionality. The on-board controller 21 may rely on one or more data maps relating to the operating conditions and the operating environment of the pumping system 11 that may be stored in the memory of controller. Each of these data maps may include a collection of data in the form of tables, graphs, and/or equations.

Figure 2:
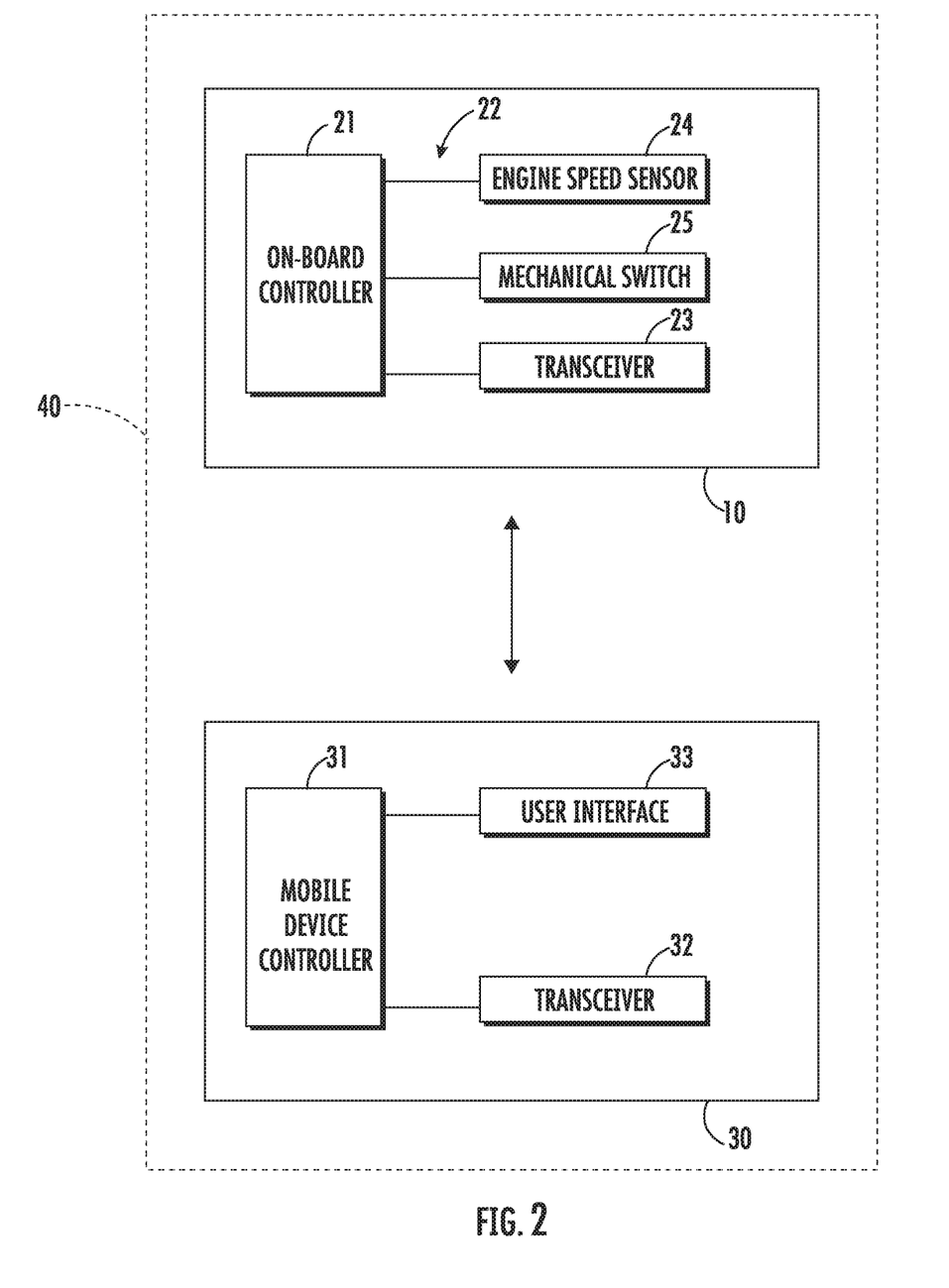
FIG. 2 depicts a block diagram of an embodiment of the wireless access system disclosed herein.

Referring to FIG. 2, the device 10 such as the pumping system 11 may include a wireless communications system such as a transceiver 23 to send and receive signals wirelessly to and from other systems including the wireless communications system of the mobile device 30. The transceiver 23 may include a receiver and transmitter that are distinct from each other or may be configured as a combined system.

The wireless communications system of the device 10 may implement or utilize any desired system or protocol including any of a plurality of communications standards. Examples of wireless communications systems or protocols that may be used by the wireless communications system include a wireless personal area network such as Bluetooth® LE or BLE or another personal area network or a local area network such as IEEE 802.11b, 802.11g, 802.11p, 802.15.4 (ZigBee), WiFi Direct, LTE Direct or, a cellular network, or any other system or protocol for data transfer. Other wireless communications systems and configurations are contemplated as would be understood by one skilled in the art.

The wireless communications system of the device 10 is configured to operate in at least two modes. In a first or enrollment mode, the transmission power of the transceiver 23 is reduced so that the transmission range of the system is reduced to a first or enrollment zone. In one example, the maximum range of the enrollment zone may be 10-20 feet. In another example, the maximum range of the enrollment zone may be no more than 30 feet. In still another example, the maximum range of the enrollment zone may be no more than 50 feet.

In a second or monitoring mode, the transmission power of the transceiver 23 may be increased relative to the first mode so that the transmission range of the system is increased to a second or monitoring zone. In one example, the maximum range of the monitoring zone may be 200-300 feet. In another example, the maximum range of the monitoring zone may be no more than 400 feet. In still another example, the maximum range of the monitoring zone may be no more than 500 feet. In some instances, the monitoring zone may be between 6-50 times the enrollment zone. Accordingly, it may be understood that in the enrollment zone, the wireless communications system is operating in a reduced or low power mode that thus provides a reduced operational distance as compared to the monitoring zone.

In some embodiments, instead of or in addition to the second mode, the wireless communications system of the device 10 may be configured to further communicate through a system having a much longer range including even a cellular network. In such case, the wireless communications system of the device 10 may permit wireless monitoring from much greater distances than the examples set forth above. For security purposes, however, it may be desirable to limit either or both of the enrollment zone and the monitoring zone to a minimum desired distance with the wireless communications system operating in a "radio" or machine-to-machine mode having a reduced range rather than using a remote system or network such as a cellular network.

The device 10 such as the pumping system 11 may be equipped with a plurality of sensors that provide data indicative (directly or indirectly) of various operating parameters of elements of the pumping system and/or the operating environment in which the system is operating. The term "sensor" is meant to be used in its broadest sense to include one or more sensors and related components that may be associated with the pumping system 11 and that may cooperate to sense various functions, operations, and operating characteristics of the element of the pumping system and/or aspects of the environment in which the system is operating.

As an example, an engine speed sensor generally indicated at 24 in FIG. 1 may be provided on or associated with the engine 12 to monitor the output speed of the engine. The engine speed sensor 24 may generate engine speed data indicative of the output speed of engine 12. Other sensors (not shown) may be associated with the engine 12, transmission 13, and hydraulic pump 14 and are operative to generate data indicative of the operation and status of the components that may be used to control the operation and determine the health of the pumping system 11 and the components thereof.

In many instances, the device 10 such as the pumping system 11 may not include a user interface operative to permit a user or operator to provide input or receive visual or haptic output from the on-board controller 21. For example, the pumping system 11 may not include any type of user input device such as a display (touch screen or standard) or a keyboard, or any other mechanism that may be used to physically interact with the device. In fact, the pumping system 11 may even lack lights that could be used to acknowledge input from an operator (e.g., by flashing or blinking the lights).

To provide a limited ability for non-wireless input to the on-board controller 21 without a user interface operatively connected to the on-board controller, a mechanical switch 25 may be operatively connected to the electrical system operatively connected to the on-board controller. The mechanical switch 25 may take any form. In one embodiment, the mechanical switch 25 may be electrically connected or hard-wired to the electrical system that is operatively connected to the on-board controller 21.

In another embodiment, such as in the a retro-fit configuration, an electrical connector (not shown) may be operatively connected to leads or wires (not shown) of a wiring harness operatively connected to the on-board controller 21. In some instances, the leads to which the electrical connector are connected may be dedicated to the function of providing the mechanical switch input to the on-board controller 21. In other instances, the leads to which the electrical connector are connected are those that, when disconnected, will not affect the operation of the pumping system 11 at the time that the electrical connector is disconnected. In other words, an electrical connector and wires may be dedicated to the mechanical switch input purpose or an existing electrical connector and wires may be used as the mechanical switch so long as the disconnection and reconnection of the electrical connector (to actuate the mechanical switch) will not affect the operation of the pumping system 11 at the time the connector is disconnected.

Inasmuch as the device 10 such as the pumping system 11 may be operating at a remote location, it may not be connected to a remote system such as a "back office" system used to control various aspects of the device. Such a back office system typically includes a remote server including a controller similar to the on-board controller 21 described above.

A device identification number such as a serial number of the engine 12 and/or other components as well as a plurality of salt numbers used for security purposes may be stored within the on-board controller 21 as described in more detail below.

One or more mobile devices 30 may be used in conjunction with the device 10 such as the pumping system to monitor and control various aspects of the operation of the pumping system. Each mobile device 30 may be a smart phone, a tablet, or any other device suitable for use consistent with the present disclosure. The mobile device 30 may include a mobile device controller 31 similar to the on-board controller 21 described above. Accordingly, the description of the mobile device controller 31 is not repeated herein.

The mobile device 30 may further include a wireless communications system such as a transceiver 32 to send and receive signals wirelessly to and from other systems including the transceiver 23 of the device 10. If the mobile device 30 is a cellular phone, it may be configured with a wireless communications system capable of operating in the first and second modes described above with respect to the wireless communications system of the device 10 as well including cellular network capabilities. In other embodiments, the mobile device 30 may be configured with a limited range to operate only in a radio or machine-to-machine mode. As described above, regardless of the capabilities of the wireless communications system of the mobile device 30, for security purpose it may be desirable to operate the wireless communications system with a limited range when operating with the wireless access system 40 described herein.

In addition, the mobile device 30 may include a user interface 33 such as a touch screen display, a keypad, and/or any other type of user interface that may allow an operator to provide desired input and receive desired output. A serial number of the mobile device 30 may be stored within or by the mobile device controller 31 if desired. Further, various applications or "apps" may be downloaded to the mobile device 30.

A wireless access system 40 may be provided between the device 10 such as the pumping system 11 and the mobile device 30 to control access to the device including information regarding its operation as well as control of various functions of the device. Such information regarding the operation may include the health of various aspects of the device 10 including error codes that may arise, necessary maintenance as well as expected due dates for such maintenance, together with any other desired information. Examples of functions that may be controlled remotely include the engine speed of the engine 12 as well as any other desired functions.

Authorized personnel may be granted different levels of access to the device 10. For example, one or more users may be granted full administrative rights or authority with the ability to read any or all aspects of the data from the device, write data or reset the status of aspects of the device 10, as well as set or revoke the access level for other users. Basic users may only have the ability to read public information such as the health of the device 10 (e.g., whether any error or maintenance codes have been triggered) and the number of hours the device has been in operation. In some instances, additional or intermediate levels of access may be granted such as providing a manager with the ability to write or reset certain types of data (e.g., resetting a maintenance code after an oil change has been completed). Other levels of access and authority are contemplated as would be understood by one skilled in the art.

It should be noted that inasmuch as the device 10 such as the pumping system 11 may not be connected to a remote system such as a back office, the wireless access system 40 may be configured to operate without interaction between the device 10 and the remote system or between the mobile device 30 and the remote system while the mobile device is interacting with the device 10. Accordingly, the wireless access system 40 is configured to operate without the need for access to a remote system such as a back office or a controller remote from the device 10 and the mobile device 30.

FIGS. 3-7 illustrate flowcharts of various aspects of the operation of the wireless access system 40. As an initial matter, an application providing an interface and the necessary software and functionality for the wireless access system 40 may be downloaded to the mobile device controller 31.

Figure 3:
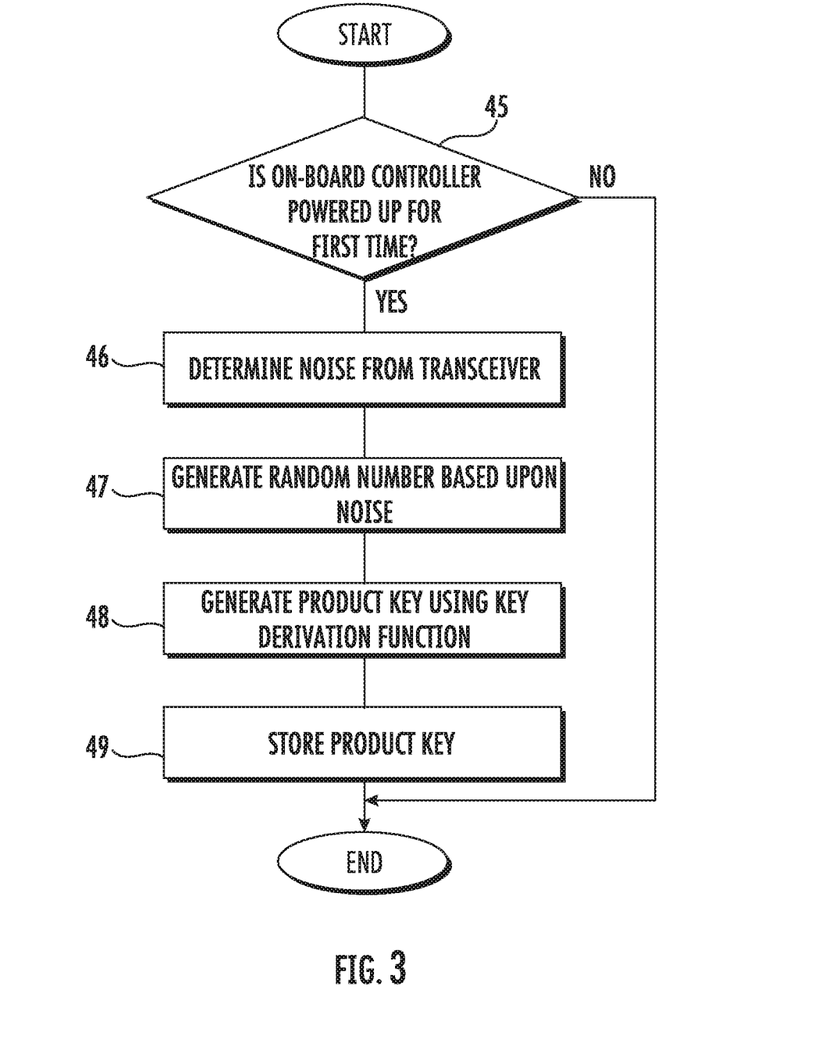
FIG. 3 depicts a flowchart illustrating a process for determining a product or device key.

Referring to FIG. 3, a product key may be generated the first time the on-board controller 21 is powered up when mounted on the device 10. At decision stage 45, the on-board controller 21 may determine whether it is being powered up for the first time. If the on-board controller 21 is being powered up for the first time, the controller may determine at stage 46 the amount of noise being received by the transceiver 23. The on-board controller 21 may then utilize the amount of noise determined at stage 46 to generate a random number at stage 47. The use of the amount of noise to generate the random number increases the likelihood that the number is actually random and cannot be derived. The random number may be generated in other manners as would be understood by one skilled in the art.

At stage 48, the on-board controller 21 may, using a key derivation function, generate a product key based upon the random number, the device identification number such as the serial number of the engine 12, and a first salt number. The product key may be stored within or by the on-board controller 21 at stage 49. If the onboard controller 21 is not being powered up for the first time, the process of stages 50-54 are skipped.

Figure 4:
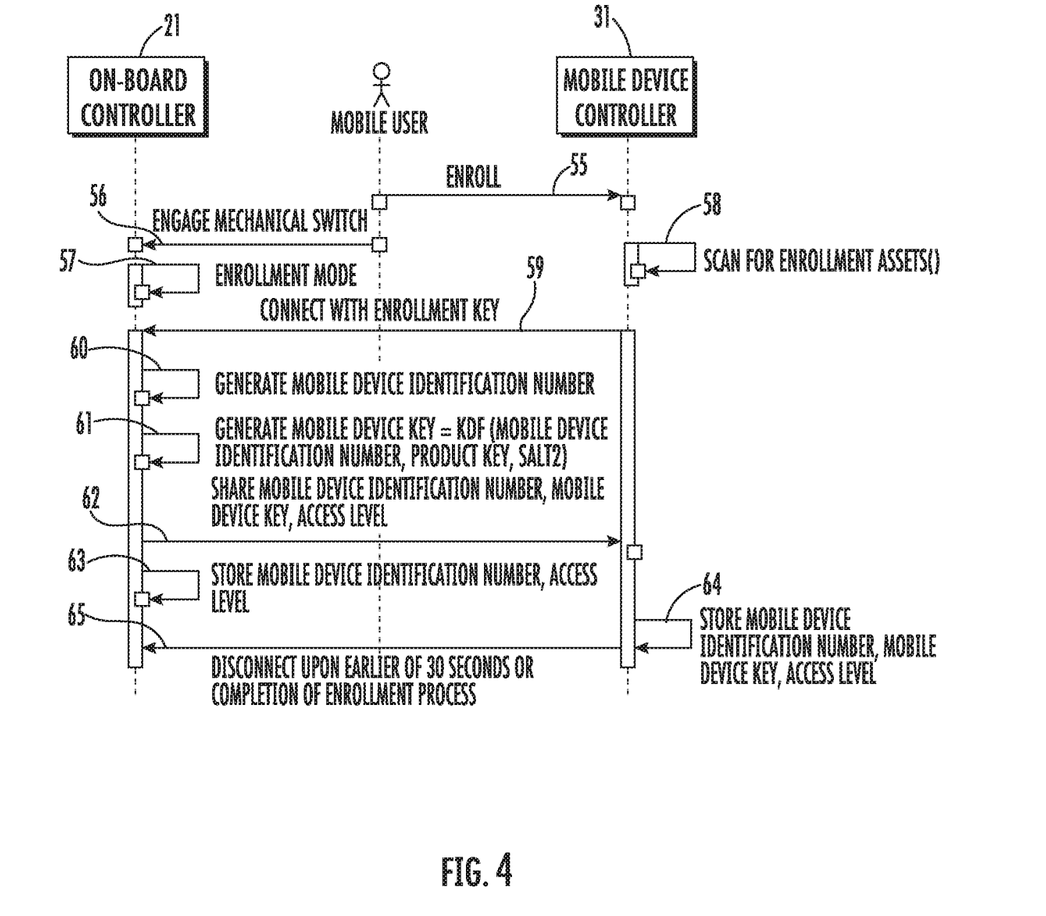
FIG. 4 depicts a flowchart illustrating a process for enrolling mobile devices for use with an on-board controller.

Referring to FIG. 4, a process for enrolling each mobile device 30 with respect to a device 10 is depicted. Such a process is used the first time each mobile device 30 seeks to gain access to the on-board controller 21 of the device 10 through the wireless access system 40 in order to permit or authorize subsequent access to the device by the mobile device. It should be noted that if the authority to access to the wireless access system 40 by a mobile device 30 is terminated, the enrollment process will be will need to be repeated.

At stage 55, an operator may press a button or perform another type of input operation on the user interface 33 of the mobile device 30.

At stage 56, the operator may physically actuate the mechanical switch 25 that is operatively connected to the electrical system of the device 10 and connected to the on-board controller 21. As discussed above, in an embodiment, the actuation of the mechanical switch 25 may be performed by disconnecting and reconnecting an electrical connector (not shown) that is connected to the wiring harness of the device 10. Upon reconnecting the electrical connector, the on-board controller 21 enters the enrollment mode at stage 57.

The mobile device controller 31 may determine at stage 58 whether any devices are in the enrollment mode. To do so, the mobile device controller 31 may perform a scan to determine whether any assets in proximity to the mobile device 30 are in the enrollment mode. If the mobile device does not detect any assets in the enrollment mode, the mobile device controller 31 may generate an alert to the operator. In such case, the operator may again press the button on the user interface 33 of the mobile device 30 to begin the enrollment process.

At least one of the on-board controller 21 and its transceiver 23 and the mobile device controller 31 and its transceiver 32 may be configured to enter a reduced power mode in which the transmission power of the transmitter portion of the respective transceiver is reduced so that the mobile device 30 must be within a specified distance from the device 10 in order to complete the enrollment process.

By requiring physical access to the device 10 in order to operate the mechanical switch 25 and by requiring the mobile device 30 to be a relatively short distance from the transceiver 23, improved security may be achieved. More specifically, the devices 10 are typically situated at locations at a work site having physical security. By requiring physical access to the device 10 to operate the mechanical switch 25, wireless access system 40 also relies upon the physical security located at the work site. Further, by operating in reduced power mode to reduce the transmission range of one or both of the transceiver 23 of the device 10 and the transceiver 32 of the mobile device 30, the difficulty in gaining access to the device 10 by hacking is increased.

The mobile device controller 31 may send to the on-board controller 21 at stage 59 an enrollment key. Such an enrollment key may be any type of number. In an example, the enrollment key may be the serial number of the mobile device 30.

Upon receiving the enrollment key, the on-board controller 21 may begin the enrollment process. To do so, at stage 60, the on-board controller 21 may first generate a mobile device identification number. The mobile device identification number may be any type of number, including a random number, and is specific or unique to the combination of the on-board controller 21 and the mobile device 30. As a result, each on-board controller 21 may be associated with a plurality of mobile device identification numbers, with each mobile device identification number corresponding to a mobile device 30 enrolled with the on-board controller. Similarly, each mobile device may be associated with a plurality of mobile device identification numbers, with each of those mobile device identification numbers corresponding to the on-board controllers 21 with which the mobile device is enrolled.

At stage 61, the mobile device controller 31 may generate a mobile device key. To do so, the on-board controller 21 may, using a key derivation function, generate the mobile device key based upon the mobile device identification number, the product key stored within or by the on-board controller at stage 48, and a second salt number.

The on-board controller 21 may at stage 62 transmit to the mobile device 30 the mobile device identification number, the mobile device key and the access level granted to the mobile device. If the mobile device 30 is not within the required distance from the transceiver 23 of the device 10, the signal strength may be insufficient for the mobile device to receive the necessary information. The on-board controller 21 may store the mobile device identification number and the granted access level at stage 63.

After receiving the mobile device identification number, the mobile device key, and the granted access level, the mobile device controller 31 may store such information within the mobile device controller or within associated memory at stage 64. The mobile device key is not stored within or by the on-board controller 21 and may be deleted from the on-board controller 21 after transmission to the mobile device 30. Deleting the mobile device key from the on-board controller 21 may improve the security of the system by requiring the on-board controller 21 to derive the mobile device key each time it is to be used.

If desired, in order to further increase security, the enrollment process may include a timer function that limits the amount of time in which one or both of the on-board controller 21 and the mobile device controller 31 remain in the enrollment mode. In other words, an enrollment time threshold may be stored or accessed by one or both of the on-board controller 21 and the mobile device controller 31 and if the enrollment process is not completed before the expiration of the enrollment time threshold, either of the controllers may terminate the enrollment process. As depicted at stage 65, the on-board controller 21 is configured to disconnect from the mobile device controller 31 or otherwise terminate the enrollment process upon the earlier of thirty seconds or completion of the enrollment process. Other enrollment time thresholds are contemplated as would be understood by one skilled in the art.

In an embodiment, the first mobile device 30 that is enrolled with an on-board controller 21 is granted administrator rights to the on-board controller and subsequent mobile devices are granted user rights to read certain types of public information such as the health of the device 10 and the hours of use. Additional rights or access for the subsequent mobile devices 30 beyond public information may be granted by the mobile devices having administrator rights (e.g., the first mobile device 30 to be enrolled and any subsequent mobile devices granted administrator rights) as described in further detail below.

Once one or more mobile devices have been granted access to the on-board controller 21 through the enrollment process, the wireless access system 40 may operate in its normal operational mode to permit authorized mobile devices 10 to monitor the operation of the device 10. For example, referring to FIG. 5, at stage 70, each of the on-board controllers 21 may transmit or broadcast the data that has been specified as being public data. As described above, in an embodiment, such public data may include the health of the devices 10 and the number of hours of operation. Any of the mobile devices 320 operating within the range of operation of the on-board controllers 21 may scan at stage 71 for broadcasts and display the public information of the devices 10 associated with the on-board controllers 21 with which they are enrolled. In an embodiment, the scanning or transmitting range may be 200-300 feet. Other ranges are contemplated as would be understood by one skilled in the art.

Figure 5:
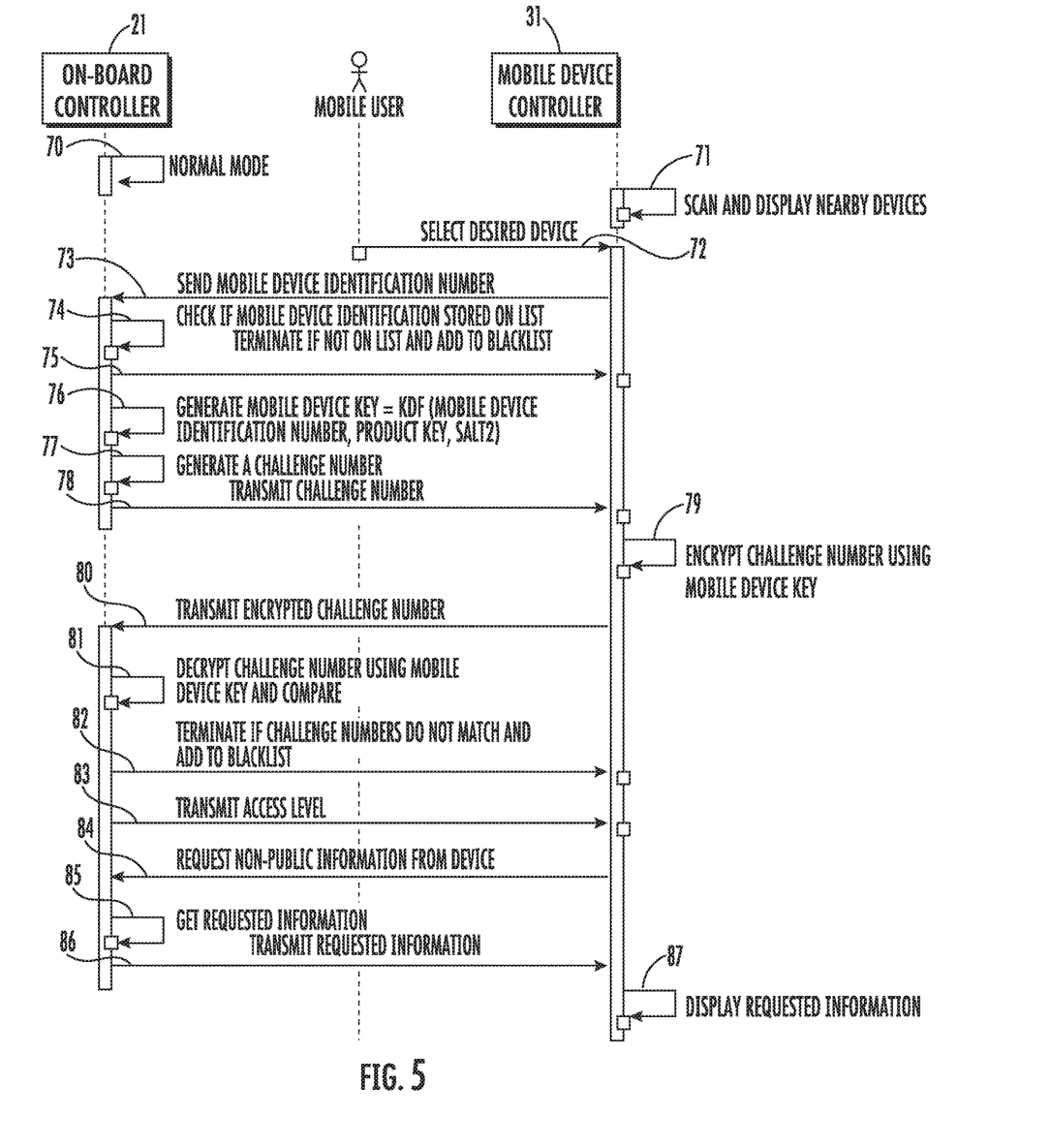
FIG. 5 depicts a flowchart illustrating a process for reading public and non-public information from the on-board controller.

If an operator of a mobile device 30 wants to gain additional access to or change the data of a device 10 associated with an on-board controller 21 with which it is enrolled, the operator may select at stage 72 the device from the display on the user interface 33 of the mobile device. At stage 73, the mobile device controller 31 may send to the selected on-board controller 21 the mobile device identification number stored within or by the mobile device controller.

At stage 74, the on-board controller 21 may determine whether the mobile device identification number received from the mobile device controller 31 is stored within a list within or accessible by the on-board controller of mobile devices that are authorized to have additional access to or the right to change data of the device 10. If the mobile device identification number received by the on-board controller 21 is not on the authorized list, the on-board controller may terminate the attempt to access additional information and add at stage 75 the received mobile device identification number to a list of unauthorized mobile device identification numbers.

If the received mobile device identification number is on the authorized list, the on-board controller 21 and mobile device controller 31 may perform a series of additional steps to confirm the authority and/or identity of the mobile device 30. For example, at stage 76, the on-board controller 21 may generate a mobile device key in a manner similar or identical to stage 61 described above. To do so, the on-board controller 21 may, using a key derivation function, generate the mobile device key based upon the mobile device identification number, the product key stored within or by the on-board controller at stage 54, and the second salt number.

At stage 77, the on-board controller 21 may generate in any desired manner a challenge number such as a random number. The on-board controller 21 may transmit at stage 78 the challenge number to the transceiver 32 of the mobile device 30. The mobile device controller 31 may then encrypt at stage 79 the challenge number using the mobile device key stored at stage 64. The encrypted challenge number is then transmitted at stage 80 to the on-board controller 21 by the mobile device controller 31.

Using the mobile device key generated at stage 76, the on-board controller 21 may at stage 81 decrypt the encrypted challenge number and compare the decrypted challenge number to the original challenge number sent by the on-board controller. If the decrypted challenge number does not match the original challenge number, the on-board controller 21 may at stage 82 terminate the communication process and add the mobile device identification number to the list of unauthorized mobile device identification numbers.

If the decrypted challenge number matches the original challenge number, the on-board controller 21 may at stage 83 transmit to the mobile device 30 the latest access level for that mobile device. This may be desirable since the access level granted to the mobile device may change through the operation of other mobile devices that have an authorization to do so. In an embodiment, a mobile device 30 having full authorization for a particular device 10 may change or suspend the authorization of any other mobile device having access to that device.

Once the authorization level of the mobile device 30 has been confirmed and access granted, the operator may at stage 84 generate a request for reading non-public information. At stage 85, the on-board controller 21 may obtain the requested information and transmit the requested information to the mobile device at stage 86. At stage 87, the requested information may be displayed on the user interface 33 of the mobile device 30.

Figure 6:
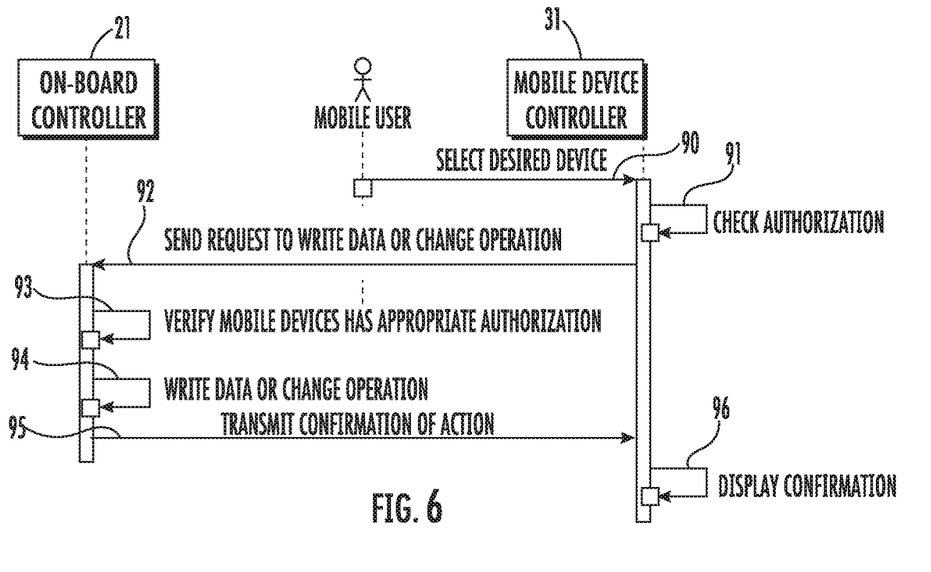
FIG. 6 depicts a flowchart illustrating a process for writing data or changing an operation of the on-board controller.

Referring to FIG. 6, a process is depicted in which an operator of a mobile device 30 may write data or change the operation or thresholds of the device 10. For example, it is typically desirable to update the status of the system after an oil change or other maintenance has been performed. In another example, the on-board controller 21 may be configured to control the engine 12 so that it operates at a constant, specified rate (e.g., rpm) and the operator may change that rate. For example, the engine 12 may be controlled by the on-board controller 21 to rotate at 2000 rpm and the operator may desire to change the rate such as to 2500 rpm. In some embodiments, to write data or change the operation of the device 10, the operator may be required to be an administrator. In other embodiments, the operator may be granted limited rights to write data or change an operation or a threshold.

If the operator of a mobile device 30 wants to write data or change the operation of a device 10 associated with an on-board controller 21 with which it is enrolled, the operator may select at stage 90 the device from the display on the user interface 33 of the mobile device. The mobile device controller 31 may be configured to verify at stage 91 that the mobile device 30 has the appropriate level of authorization. If the mobile device 30 does not have the appropriate level of authorization, the process may be terminated.

At stage 92, the mobile device controller 31 may send to the selected on-board controller 21 a request to write data or change the operation or thresholds of the device 10. At stage 93, the on-board controller 21 may verify that the mobile device 30 has the necessary level of authorization to perform the desired operation. To do so, the on-board controller 21 may interact with the mobile device controller 31 as set forth at stages 73-82 to confirm the authorization level of the mobile device 30.

Provided that the mobile device 30 is authorized to perform the desired tasks, the on-board controller 21 will at stage 94 write data or change the operation of the device 10 as requested by the mobile device. At stage 95, the on-board controller 21 may transmit to the mobile device a confirmation that the data has been written or the operation or thresholds of the device 10 changed. At stage 96, the confirmation may be displayed on the user interface 33 of the mobile device 30.

Figure 7:
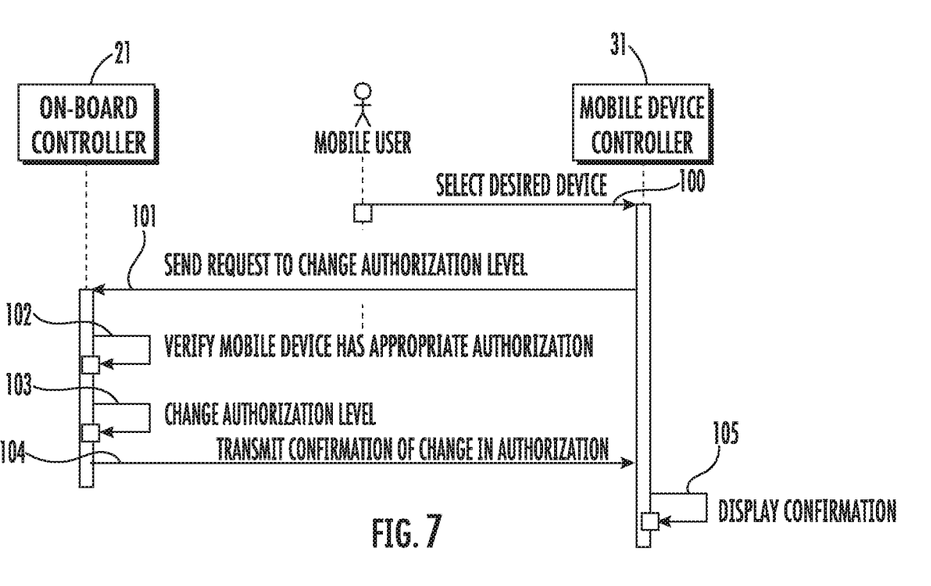
FIG. 7 depicts a flowchart illustrating a process for changing an authorization level of a mobile device.

Referring to FIG. 7, a process is depicted in which an operator of a mobile device 30 having administrative rights may change the authorization level of other mobile devices 30. For example, an operator having administrative rights may upgrade, downgrade, or terminate the rights of other mobile devices 30. The mobile device 30 used by the operator to change the authorization level of other mobile devices may be referred to herein as a "master mobile device."

If the operator of the master mobile device 30 having administrative rights wants to change the authorization level of another mobile device for a particular device, the operator may select the device 10 and enter at stage 100 in the user interface 33 the mobile device identification code of the mobile device for which the change is to be made and the change desired. At stage 101, the mobile device controller 31 of the master mobile device 30 may send to the selected on-board controller 21 the request to change the authorization level of the other mobile device. At stage 102, the on-board controller 21 may verify that the master mobile device 30 has the necessary level of authorization to perform the desired change in authorization level. To do so, the on-board controller 21 may interact as set forth at stages 73-82 with the mobile device controller 31 of the master mobile device to confirm the authorization level of the master mobile device.

Provided that the master mobile device 30 is authorized to perform the desired change in authorization level, the on-board controller 21 will at stage 103, change the authorization level of the other mobile device as requested by the master mobile device. At stage 104, the on-board controller 21 may transmit to the master mobile device a confirmation that the change in authorization has been completed. At stage 105, the confirmation may be displayed on the user interface 33 of the master mobile device 30.

INDUSTRIAL APPLICABILITY

The industrial applicability of the systems described herein will be readily appreciated from the forgoing discussion. The foregoing discussion is applicable to wireless access systems 40 used with devices 10 at a work site in which it is desirable to remotely access and modify information from such devices. Such work sites may include a mining site, a landfill, a quarry, a construction site, a roadwork site, or any other area in which the devices 10 are used.

The information that may be accessed and/or modified may be categorized based upon the authorization level granted to the mobile device operator. In an embodiment, a lowest level of authorization may provide access to "publicly designated" information such as the health of the device (i.e., whether any error or maintenance codes have been generated) and the number of hours of operation of the device. A higher level of authorization may permit access to non-public information, which may include details of the device operation such as details regarding any error or maintenance codes. Further, with sufficient authorization (e.g., such as full administrative rights), data relative to the device 10 may be written, stored, or re-set such as is desirable after maintenance operations are performed and changes in operation Full administrative rights may prove the right to modify the access rights of other mobile devices 30 such as by increasing, decreasing, or terminating the rights of the other mobile devices.

The wireless access system 40 may be particularly useful with devices 10 that are not connected to a remote system such as a back office system. More specifically, such devices 10 may be free-standing devices that are fully functional without requiring instructions from a remote system. Access to the on-board controller 21 controlling the operation of a device 10 is not controlled by a remote system such as a back office but rather may be controlled by one or more mobile devices in proximity to the device. Still further, the wireless access system 40 may be particularly useful with devices 10 in which the on-board controller 21 does not include a user interface operative to permit a user or operator to provide input or receive visual or haptic output from the on-board controller 21.

In addition, a plurality of devices 10 may be provided at a work site but without communication, or with limited communication, between the devices. This may be desirable so that the loss or hacking of one mobile device 30 reduces the likelihood of unauthorized access to data or unauthorized changes being made to other devices at the work site.

In some instances, all or a portion of the wireless access system 40 may be used with devices 10 that are connected to a remote system such as a back office. Further, in some instances, all or a portion of the wireless access system 40 may be used with devices 10 that include a user interface that permits a user or operator to provide input or receive visual or haptic output from the on-board controller 21.

The wireless access system 40 is configured to separate and limit access to devices 10 through mobile devices 30 so that the loss or hacking of a mobile device will not permit access to other non-authorized devices. In addition, access by the lost or hacked mobile device 30 to authorized devices 10 may be readily terminated.

It will be appreciated that the foregoing description provides examples of the disclosed system and technique. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A method of enrolling a mobile device to provide subsequent access to a device, comprising:
 a) actuating a mechanical switch electrically connected to the device;
 b) generating, with an on-board controller, a mobile device identification number specific to the on-board controller and the mobile device, wherein the on-board controller is not operatively connected to a user interface at the device;
 c) generating, with the on-board controller of the device, a mobile device key;
 d) transmitting, from the device to the mobile device, the mobile device identification number and the mobile device key;
 e) storing, with the on-board controller, the mobile device identification number; and
 f) storing, with a mobile device controller, the mobile device identification number and the mobile device key.

2. The method of claim 1, further comprising deleting, by the on-board controller, the mobile device key after transmitting the mobile device key to the mobile device.

3. The method of claim 1, while performing step d), operating at least one of a transmitter of the device and a transmitter of the mobile device in a low power mode.

4. The method of claim 1, wherein the steps a)-f) are performed without accessing a controller remote from the device and the mobile device.

5. The method of claim 1, further comprising determining an amount of noise received by a wireless communications system of the device, and generating the mobile device key based upon the amount of noise received by the wireless communications system of the device.

6. The method of claim 5, further comprising generating, by the on-board controller, a product key of the device using a key derivation function, and generating the product key based upon the amount of noise received by the wireless communications system of the device.

7. The method of claim 6, further comprising generating the mobile device key based upon the product key.

8. The method of claim 1, while performing step d),
operating at least one of a transmitter of the device and a transmitter of the mobile device in an enrollment mode to provide a reduced operational distance between the device and the mobile device.

9. The method of claim 8, further comprising using the mobile device to monitor data from the device while operating in a monitoring mode, the monitoring mode having a greater operational distance between the device and the mobile device as compared to the enrollment mode.

10. The method of claim 1, further comprising generating, with the on-board controller, an access level of the mobile device, and storing, with the on-board controller, the access level.

11. The method of claim 10, further comprising transmitting, from the device to the mobile device, the access level and storing, with the mobile device controller, the access level.

12. The method of claim 1, further comprising terminating the method of enrolling the mobile device upon expiration of an enrollment time threshold.

13. The method of claim 1, comprising terminating the method of enrolling the mobile device upon an earlier of completion of an enrollment process and expiration of an enrollment time threshold.

14. A system for enrolling a mobile device to provide subsequent access to a device, comprising:
a mechanical switch electrically connected to the device;
an on-board controller operatively connected to the device, wherein the on-board controller is not operatively connected to a user interface at the device, the on-board controller configured to:
 a) after actuation of the mechanical switch, generate a mobile device key;
 b) generate a mobile device identification number specific to the on-board controller and the mobile device;
 c) transmit to the mobile device the mobile device identification number and the mobile device key; and
 d) store the mobile device identification number; and
the mobile device comprising a user interface and a mobile device controller, the mobile device controller being configured to:
 store the mobile device identification number and the mobile device key.

15. The system of claim 14, wherein the on-board controller is further configured to delete the mobile device key after transmitting the mobile device key to the mobile device.

16. The system of claim 14, wherein the on-board controller is configured to perform steps a)-c) without accessing a controller remote from the device and the mobile device and the mobile device controller is configured to perform step d) without accessing a controller remote from the device and the mobile device.

17. The system of claim 14, Wherein the on-board controller is further configured to determine an amount of noise received by a wireless communications system of the device, and generate the mobile device key based upon the amount of noise received by the wireless communications system.

* * * * *